(12) United States Patent
Isaac et al.

(10) Patent No.: US 11,240,958 B2
(45) Date of Patent: Feb. 8, 2022

(54) DISCHARGING RESIDUE FROM A COMBINE HARVESTER

(71) Applicant: CNH Industrial America LLC, New Holland, PA (US)

(72) Inventors: Nathan E. Isaac, Lancaster, PA (US); Austin Jackson, Jackson, SC (US); Mark Dilts, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 207 days.

(21) Appl. No.: 16/414,890

(22) Filed: May 17, 2019

(65) Prior Publication Data

US 2019/0350132 A1    Nov. 21, 2019

Related U.S. Application Data (60) Provisional application No. 62/672,633, filed on May 17, 2018.

(51) Int. Cl.
*A01D 41/12* (2006.01)
*A01D 41/127* (2006.01)
*A01F 12/44* (2006.01)

(52) U.S. Cl.
CPC ....... *A01D 41/1243* (2013.01); *A01D 41/127* (2013.01); *A01F 12/44* (2013.01)

(58) Field of Classification Search
CPC .. A01D 41/12; A01D 41/1243; A01D 41/127; A01F 12/40; A01F 12/44

(Continued)

(56) References Cited

U.S. PATENT DOCUMENTS 9,578,803 B2 *   2/2017   Desmet .................. A01D 61/00
9,668,418 B2 *   6/2017   Patton ................. A01D 41/1243
(Continued)

FOREIGN PATENT DOCUMENTS

EP     2702853 A1    3/2014
EP     2708108 A1    3/2014
(Continued)

OTHER PUBLICATIONS

Extended European Search Report for EP Application No. 19175175.9 dated Oct. 28, 2019 (six pages).

*Primary Examiner* — Alicia Torres
*Assistant Examiner* — Matthew Ian Neal
(74) *Attorney, Agent, or Firm* — Peter Zacharias; Patrick Sheldrake (57) ABSTRACT

An embodiment includes a combine including a sensor positioned to detect a physical characteristic of a windrow produced by the combine or an operational state of the combine, a windrow door for expelling the residue from the combine, a windrow door actuator coupled to the windrow door to position the windrow door at a windrow door angle, a windrow chute for receiving the expelled residue from the windrow door and guiding the residue into a windrow, a windrow chute actuator coupled to the windrow chute to position the windrow chute at a windrow chute angle, a controller configured to determine a physical characteristic of the windrow or the operational state of the combine based on an output of the sensor, and adjust at least one of the windrow door angle or the windrow chute angle based on the determined physical characteristic or operational state.

10 Claims, 11 Drawing Sheets

(58) Field of Classification Search
USPC .......................................................... 460/111
See application file for complete search history.

(56) References Cited

U.S. PATENT DOCUMENTS

| | | | | |
|---|---|---|---|---|
| 10,820,502 | B2* | 11/2020 | Beavers | ................... A01F 29/12 |
| 2014/0066147 | A1* | 3/2014 | Dilts | ................... A01D 41/1243 |
| | | | | 460/111 |
| 2015/0011276 | A1* | 1/2015 | Murray | .............. A01D 41/1243 |
| | | | | 460/111 |
| 2015/0264864 | A1 | 9/2015 | Branch et al. | |
| 2017/0086372 | A1* | 3/2017 | Palla | .................... A01D 41/127 |
| 2017/0265390 | A1 | 9/2017 | Panoushek et al. | |
| 2018/0310474 | A1* | 11/2018 | Posselius | ............. A01D 41/127 |
| 2019/0021229 | A1* | 1/2019 | Treffer | ................... A01D 57/16 |
| 2019/0084764 | A1* | 3/2019 | Dilts | .................... B65G 11/126 |
| 2019/0124849 | A1* | 5/2019 | Farley | .................... A01F 12/46 |

FOREIGN PATENT DOCUMENTS

| | | |
|---|---|---|
| EP | 2820937 A1 | 1/2015 |
| EP | 2936962 A1 | 10/2015 |
| EP | 1862055 B1 | 5/2017 |
| WO | 2016105457 A2 | 6/2016 |

* cited by examiner

DISCHARGING RESIDUE FROM A COMBINE HARVESTER

FIELD

The disclosure relates to a combine that determines wind effects by observing residue spread on the ground, and then adjusts operational parameters of the residue spreading system accordingly.

BACKGROUND

Combines are vehicles that harvest crops. Operations performed by these combines include threshing and separating grain from crop residue, and expelling the residue from the combine into windrows which are then collected at a later time. Terrain, wind and other factors alter the physical characteristics of the windrow which may complicate windrow collection.

SUMMARY

An embodiment includes a combine having a feeder housing for receiving harvested crop, a separating system for threshing the harvested crop to produce grain and residue, a sensor positioned to detect a physical characteristic of a windrow produced by the combine or an operational state of the combine, a windrow door for expelling the residue from the combine, a windrow door actuator coupled to the windrow door to position the windrow door at a windrow door angle, a windrow chute for receiving the expelled residue from the windrow door and guiding the residue into a windrow, a windrow chute actuator coupled to the windrow chute to position the windrow chute at a windrow chute angle, a controller coupled to the sensor, the windrow door actuator, and the windrow chute actuator. The controller is configured to determine a physical characteristic of the windrow or the operational state of the combine based on an output of the sensor, and adjust at least one of the windrow door angle or the windrow chute angle based on the determined physical characteristic or operational state.

An embodiment includes a method for controlling a combine including a feeder housing for receiving harvested crop, a separating system for threshing the harvested crop to produce grain and residue, a sensor positioned to detect a physical characteristic of a windrow produced by the combine or an operational state of the combine, a windrow door for expelling the residue from the combine, a windrow door actuator coupled to the windrow door to position the windrow door at a windrow door angle, a windrow chute for receiving the expelled residue from the windrow door and guiding the residue into a windrow, a windrow chute actuator coupled to the windrow chute to position the windrow chute at a windrow chute angle, and a controller coupled to the sensor, the windrow door actuator, and the windrow chute actuator. The method includes determining, by the controller, a physical characteristic of the windrow or the operational state of the combine based on an output of the sensor, and adjusting, by the controller, at least one of the windrow door angle or the windrow chute angle based on the determined physical characteristic or operational state.

DETAILED DESCRIPTION

Aspects of the disclosure provide methods and systems for controlling the discharge of residue (e.g. straw) from a combine harvester to achieve acceptable windrows. In various embodiments described throughout the specification, the system controls residue system components such as a windrow door and a windrow chute based on a physical characteristic of the windrow or an operational parameter of the combine harvester.

The terms "grain" and "residue" are used principally throughout this specification for convenience but it is to be understood that these terms are not intended to be limiting. "Grain" refers to that part of the crop material which is threshed and separated from the discardable part of the crop material, which is referred to as non-grain crop material, material other than grain (MOG). "Residue" refers to MOG that is to be discarded from the combine. Also the terms "fore", "aft", "left," and "right", when used in connection with the agricultural harvester (e.g. combine) and/or components thereof are usually determined with reference to the direction of forward operative travel of the combine, but again, they should not be construed as limiting.

Figure 1A:
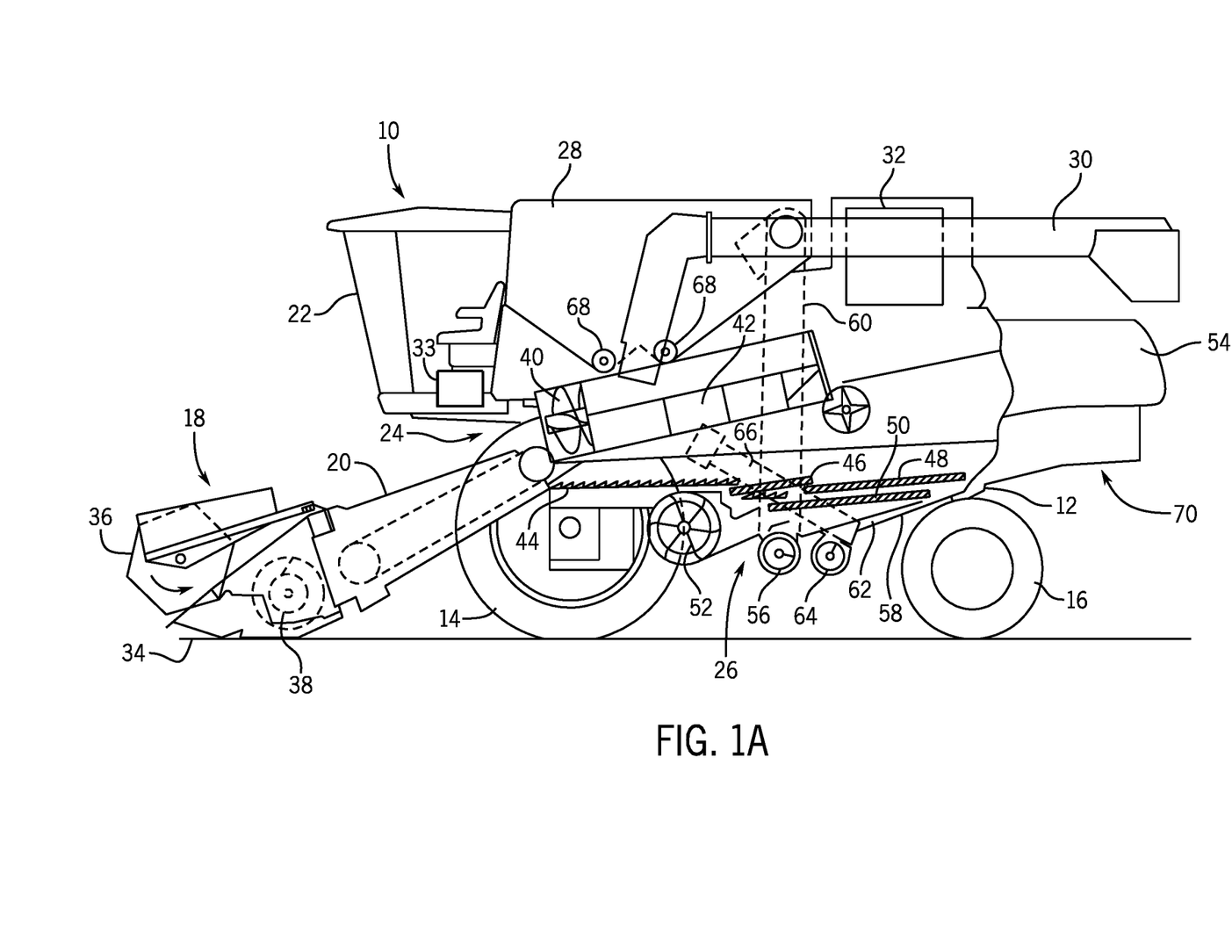
FIG. 1A is a side view of a combine, according to an embodiment of the disclosure.

Referring now to the drawings, and more particularly to FIG. 1A, there is shown one embodiment of an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half-tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger MOG elements, such as stalks, leaves and the like are discharged from residue system 70 of combine 10. Smaller elements of crop material including grain and smaller MOG materials including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

The remaining non-grain crop material (i.e. residue) proceeds through a residue handling system 70. Residue handling system 70 includes a chopper, a chopper pan, counter knives, a windrow door, a windrow chute and a residue spreader, which are not shown in FIG. 1A. When combine 10 is operating in the chopping and spreading mode, the chopper is set to a relatively high speed (e.g. 3,000 RPM), the counter knives may be engaged, the windrow door is closed and the residue spreader is running (e.g. rotating). This causes the non-grain crop material to be chopped in to pieces of approximately 6 inches or less and spread on the ground in a fairly uniform manner. In contrast, when combine 10 is operating in the windrow mode, the chopper is at a relatively low speed (e.g. 800 RPM), the counter knives are disengaged and the windrow door is open. The residue spreader may continue operation to spread only the chaff, with the crop material passing through the passageway created by the open windrow door and guided by a windrow chute as it exits the combine.

Figure 1B:
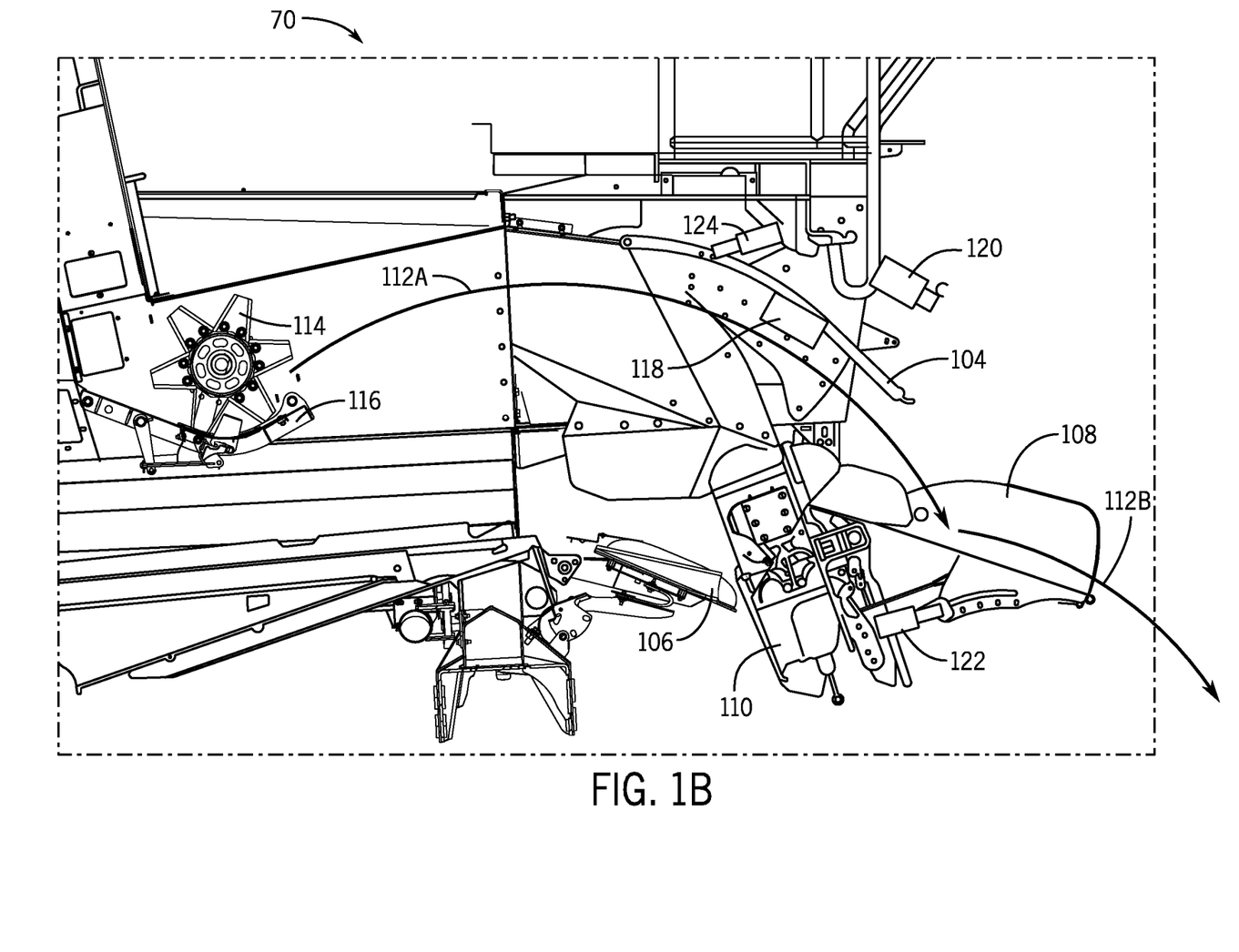
FIG. 1B is a section view of a combine residue system showing an example residue flow, according to an embodiment of the disclosure.

For sake of clarity, details of residue handling system 70 are shown in FIG. 1B. For example, as shown in FIG. 1B, residue handling system 70 includes windrow door 104, windrow door actuator 124 (e.g. linear actuator), windrow chute 108, windrow chute actuator 122 (e.g. linear actuator), chaff pan 106, spreader impeller 110, spreader deflectors (not shown), chopper 114 and chopper pan 116.

Although not shown in FIG. 1B, windrow door actuator 124, windrow chute actuator 122, spreader wheel system 110, spreader deflectors, and chopper 114 are electrically connected to a controller (e.g. programmable logic controller, micro-controller, etc.) located in the combine. The controller is programmable by the operator of the combine through a user (e.g. operator) interface, or through a remote computer (see FIG. 3). The operator, for example, enters commands through the user interface. In response to these commands, the controller sends control signals to the various actuators of residue handling system 70.

As described above, during the windrowing operation, the combine chops up the residue and attempts to discharge the residue along the ground in piles that are known as "windrows". These windrows are later collected by the combine or another vehicle. It is therefore beneficial that these windrows have a shape and size that makes them easy to collect.

In one example, combine 10 generates the windrows by executing the following process. The residue is deposited by the threshing and separating system 24 onto grate 116. Chopper 114 rotates and propels this residue along trajectory 112A. Door actuator 124 opens windrow door 104, and the propelled residue exits the combine through windrow door 104. The residue then falls onto windrow chute 108 which is positioned at an angle with respect to the ground by windrow chute actuator 122. The residue then proceeds along path 112B and falls to the ground. The controller controls the combine actuators to continuously perform this process as the combine is traveling. This process results in the formation of windrows on the ground behind the combine.

Figure 1C:
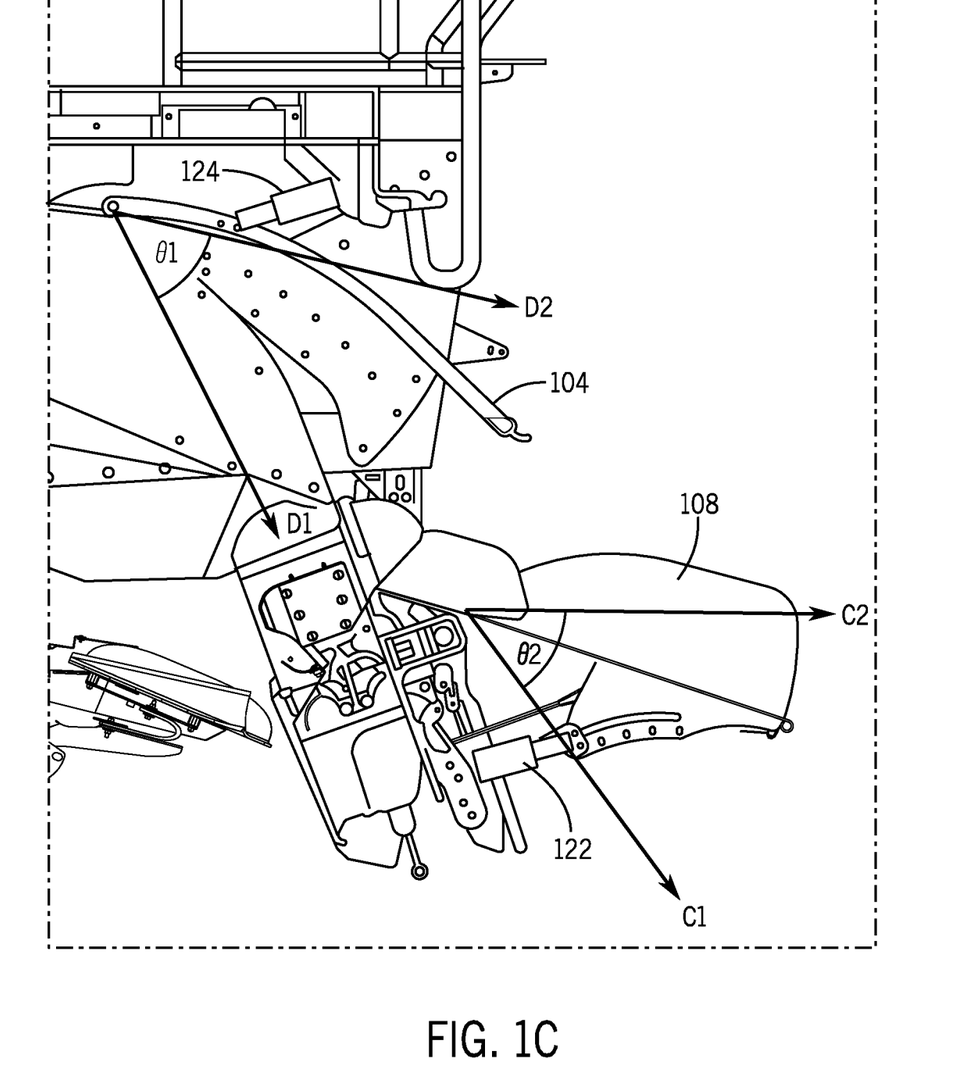
FIG. 1C is another section view of a combine residue system showing operational ranges of the windrow door and windrow chute, according to an embodiment of the disclosure.

Windrow door 104 and windrow chute 108 are hinged to the combine, and have operational ranges as shown in FIG. 1C. For example, windrow door 104 has an operational range $\theta 1$ (e.g. 45°) that extends from a fully closed position D1 to a fully opened position D2. Essentially, the angle of the windrow door increases as the door is opened, and decreases as the door is closed. Likewise, windrow chute 108 has an operational range $\theta 2$ (e.g. 45°) which extends from a fully declined position C1 to a flat, or even inclined position C2. Essentially, the angle of the windrow chute decreases as the decline with respect to the ground increases (e.g. the chute becomes more declined), and the angle of the windrow chute increases as the decline with respect to the ground decreases (e.g. the chute becomes more flat). The operational positions of windrow door 104 and windrow chute 108 within these ranges affect the physical characteristics (e.g. shape) of the windrow. Therefore, the controller is able to control the shape of the windrow by positioning windrow door 104 and windrow chute 108 in predetermined positions within their respective operational ranges.

Figure 2:
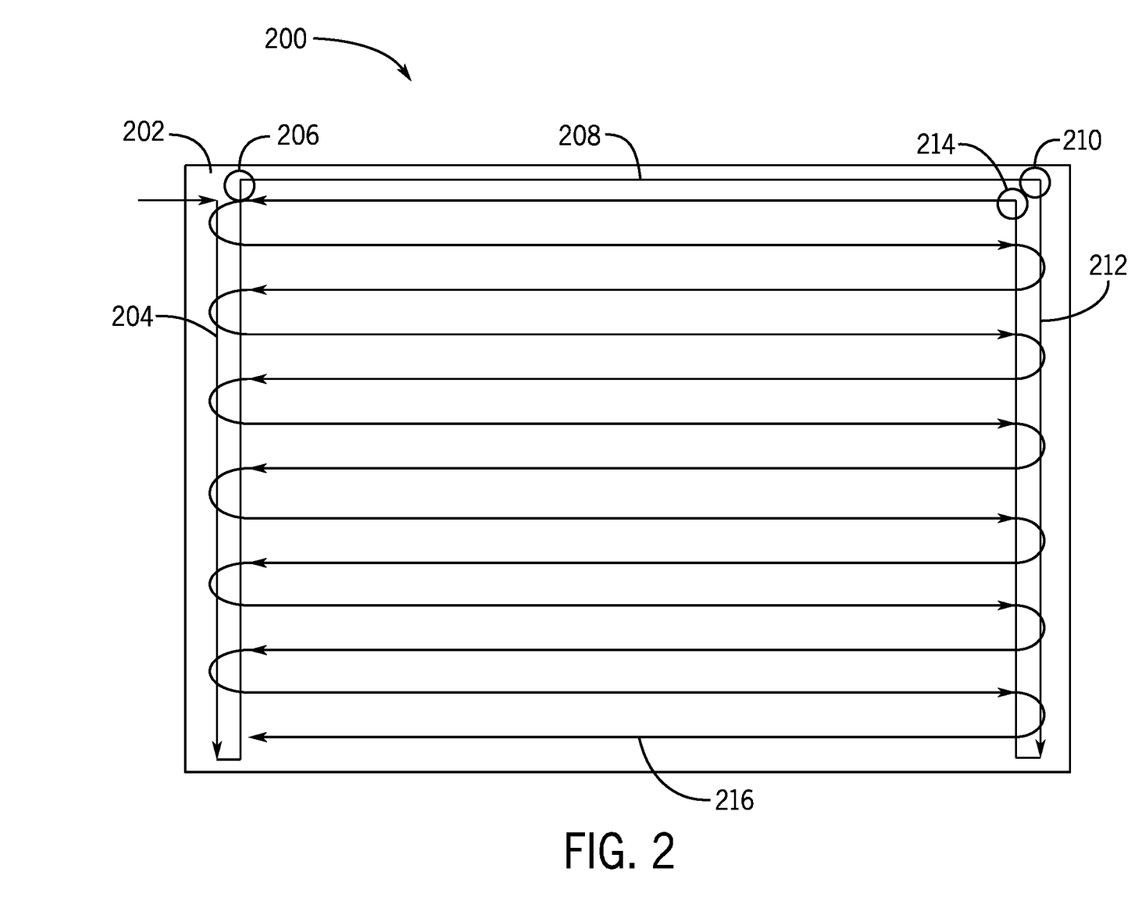
FIG. 2 is a typical path traversed by the combine during harvesting, according to an embodiment of the disclosure.

A visual depiction 200 of the pathways taken by the combine during harvesting are shown in FIG. 2 for a plot of land 202. As harvesting is performed, the combine may employ residue handling system 70 to perform either spreading and/or windrowing of the harvested crops at different locations of the field. For example, the combine may start performing spreading along path 204. Once the combine reaches point 206, a turn is made and windrowing is performed along path 208. As described above, during windrowing, the speed of chopper 114 may be reduced and the counter knives may be retracted so as to avoid chopping the straw. Once the combine reaches point 210, a turn is made and spreading is performed along path 212. Finally, once the combine reaches point 214, a turn is made and windrowing is performed in a zig-zag pattern along path 216.

In the windrow zones shown in FIG. 2, the combine controls the actuators 122 and 124 in the residue system to position the windrow door 104 and windrow chute 108 to achieve a desirable windrow shape. The combine operator may manually set the initial positions of windrow door 104 and windrow chute 108. Alternatively, the combine controller may automatically set the initial positions of windrow door 104 and windrow chute 108. When setting these variables manually, the operator may use a number of factors including but not limited to their experience, combine heading, crop type, terrain and weather forecasts (e.g. wind speed/direction). When setting these variables automatically, the combine controller may use a number of factors including but not limited to past results, combine heading, crop type, weather forecasts (e.g. wind speed/direction), and terrain inclination.

After the angles of windrow door 104 and windrow chute 108 are initially set, the operator may manually adjust, or the controller may autonomously adjust the angles of windrow door 104 and windrow chute 108 based on physical characteristic of the windrow, or an operational parameter of the combine.

In a manual adjustment embodiment, the operator visually observes the windrow shape through the use of a camera 120 or mirrors (not shown) on the combine. If the windrow shape is desirable, the combine can continue harvesting without adjustments. If the windrow shape, however, is undesirable, the operator can adjust the angle of windrow door 104 and/or the angle of windrow chute 108 until a desirable windrow is produced.

In an autonomous adjustment embodiment, the combine controller is able to observe the windrow shape via camera 120 mounted to the back of the combine. The combine controller then analyzes images captured by camera 120 and determines if the physical characteristics of the windrow is desirable according to predetermined parameters (e.g. predetermined, height, width, shape, etc.). For example, if the windrow shape is desirable, the combine can continue harvesting without adjustments. If, however, the windrow shape is undesirable, the controller adjusts the angle of windrow door 104 and/or the angle of windrow chute 108 until a desirable windrow is produced.

Alternatively, or in conjunction with the observable physical characteristic of the windrow, the controller controls windrow door 104 and windrow chute 108 based on operational parameters of the combine such as inclination. Onboard inclinometer 33 measures inclination of the combine based on terrain. The controller then adjusts the angles of windrow door 104 and windrow chute 108 as the inclination of the combine changes during the harvesting process. These two embodiments are described in more detail with respect to later figures.

Figure 3:
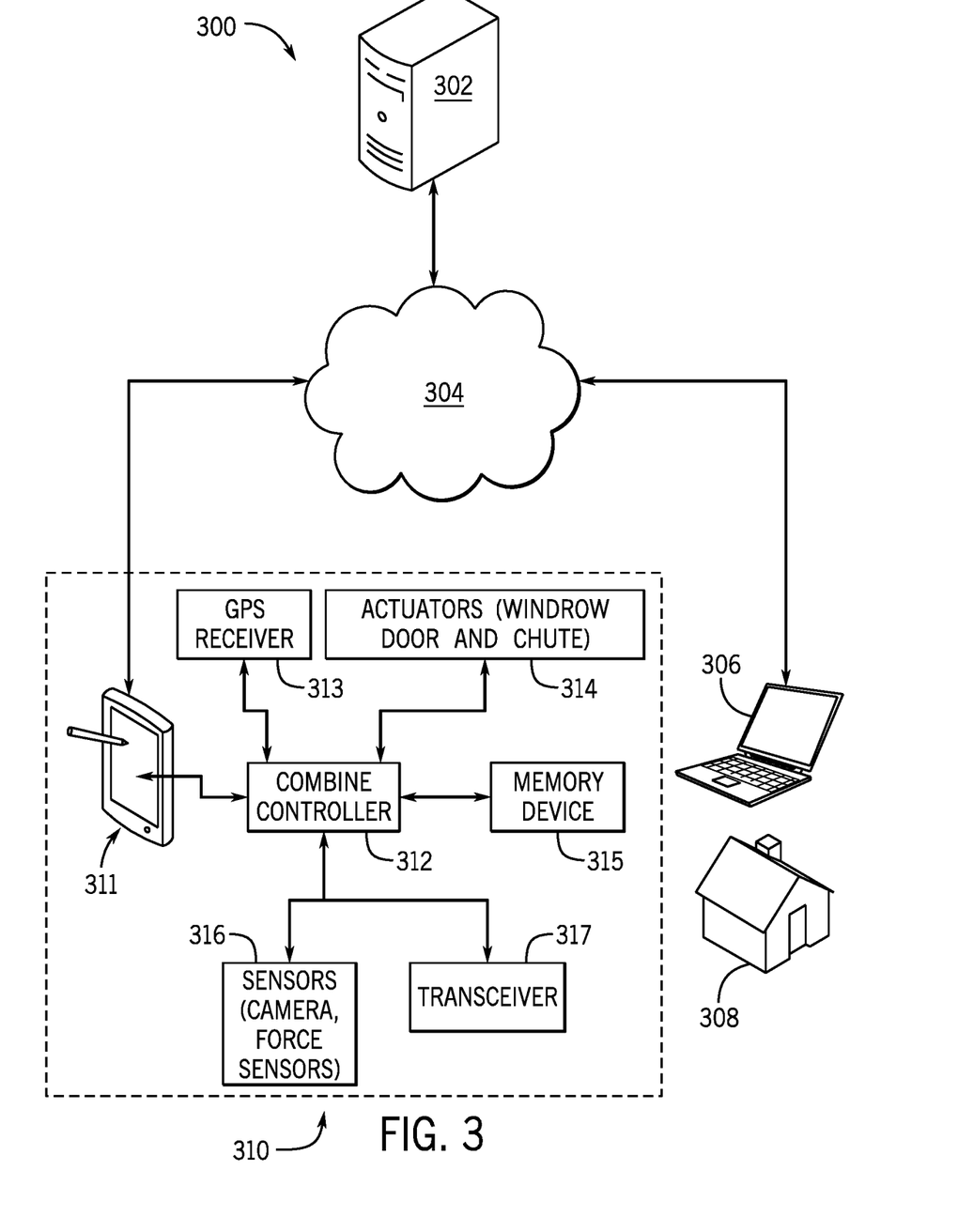
FIG. 3 is a system view of network based communication between the combine controller, a remote personal computer and a server, according to an embodiment of the disclosure.

FIG. 3 shows an example of a system, generally designated as 300, for controlling the combine. The system 300 comprises a control system 310 of combine 10, a remote PC 306 at location 308, and a remote server 302. The control system 310 of the combine 10 communicates with the remote PC 306 and the remote server 302 over a network 304 (e.g., the Internet). It should be noted that combine 10 does not have to be connected to other devices through the network 304. The controller 310 of combine 10 can alternatively be a standalone system that receives operating instructions (e.g. desirable windrow physical characteristics, relationships between inclination and windrow door/chute angles, etc.) through a user interface, or through a removable memory device (e.g. Flash Drive).

Prior to operating combine 10, an operator or the controller designate initial operating angles for the windrow door and the windrow chute. This designation may be based on the crop type, predicted terrain inclination and other factors. In one example, the operator uses an interface 311 of the combine control system 310 or the remote PC 306 located at remote location 308 to designate the windrow door/chute angles. Interface 311 and PC 306 allow the operator to view locally stored parameters from a memory device 315 of the control system 310 and/or download parameters, via a transceiver 317 (e.g. WiFi, Bluetooth, Cellular, etc.) of the control system 310, from server 302 through network 304. The operator may set (via the interface 311 or PC 306) appropriate parameters (e.g. crop type, wind speed, wind direction, initial windrow door/chute angles, etc.). Once the parameters are selected, the operator can begin harvesting. The control system 310, specifically a controller 312 thereof, then controls actuators 314 (e.g. windrow door/chute actuators 124/122) based on these initial parameters and monitors sensors 316 (e.g. windrow door/chute angle sensors (not shown), inclinometer 33, camera 120, etc.) to achieve a desirable windrow physical characteristic such (e.g. shape). A GPS receiver 313 of the control system 310 and/or dead reckoning sensors (not shown) may also be used to track the path of the combine and determine terrain. This information (e.g. heading) may be used to automatically adjust the windrow door/chute angles to account for inclination and other environmental effects.

Figure 4:
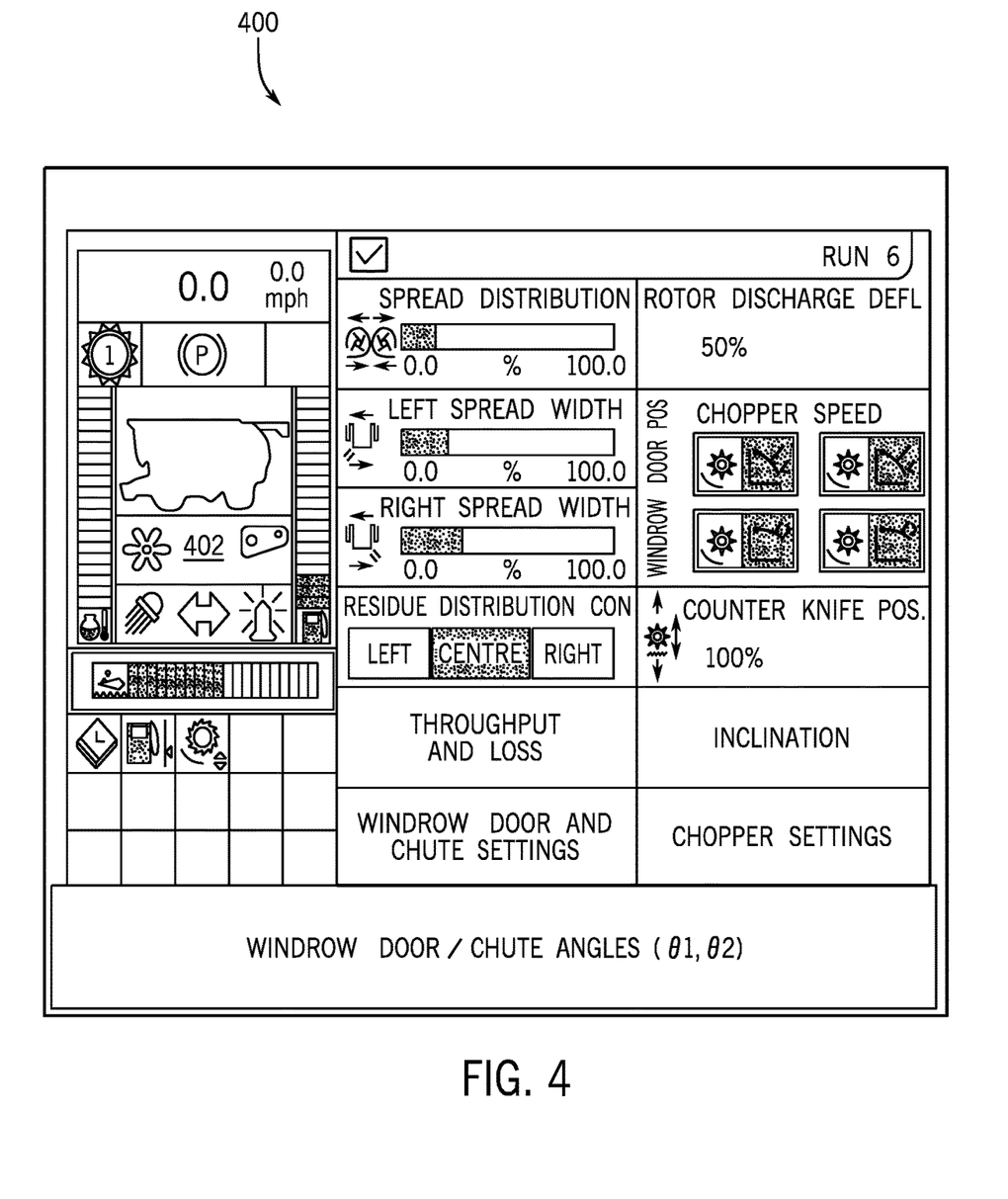
FIG. 4 is an illustration of a user interface for monitoring and controlling the combine, according to an embodiment of the disclosure.

An example of interface 311 is shown in FIG. 4 where various parameters and data are displayed to the operator through a graphical user interface (GUI) 400. These may include a view of the map 402 with designated zones (e.g. windrow zones), inclination, current operational mode (spreading/windrow modes), and operational parameters/states for the spreader wheels, chopper, counter knives, windrow door, windrow chute, spreader wheels, spreader deflectors, etc. The operator, for example, can set these parameters (e.g. windrow door/chute angles) prior to harvesting or during harvesting. For example, the operator can use a stylus or their finger on the touchscreen to set windrow door/chute angles, etc.

Figure 5:
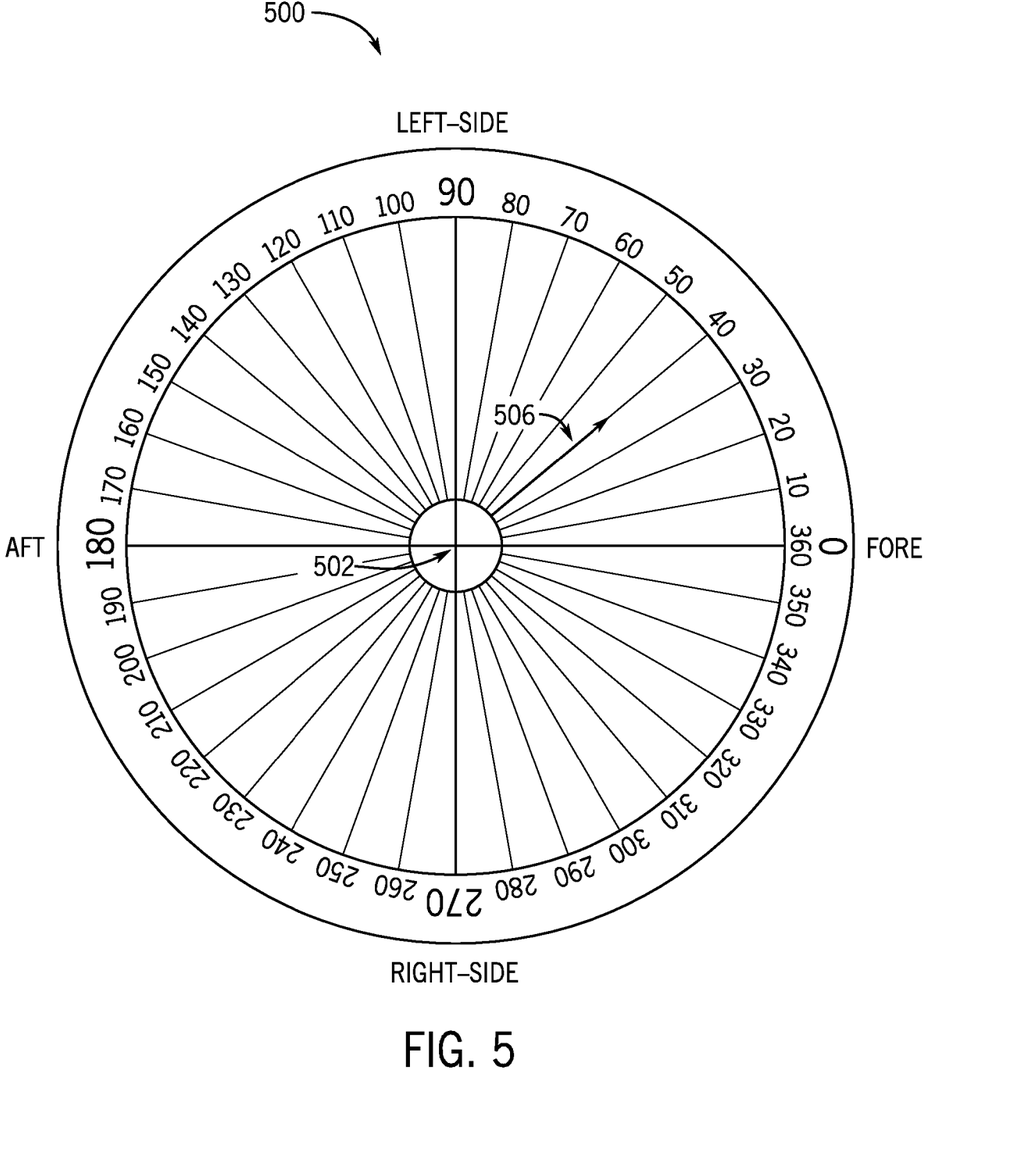
FIG. 5 shows a graphical representation of an inclinometer output, according to an embodiment of the disclosure.

As described above, inclination of the combine is one factor that the operator or controller could monitor for controlling windrow door/chute angles to achieve a desirable windrow. FIG. 5 shows a graphical representation 500 of inclination measured by inclinometer 33. As shown in FIG. 5, the horizontal axis extends from Fore-to-Aft (i.e. front to back) of the combine, whereas the vertical axis extends from side-to-side (e.g. right-side to the left-side). In one example, vector 506 represents the measured inclination of the combine. Vector 506 extends from origin 502 and has Fore-to-Aft magnitude on the horizontal axis and a left-to-right magnitude on the vertical axis. The horizontal and vertical magnitudes of vector 506 describe both the direction and severity of the inclination. In this example, it is determined that the combine is inclined towards the Fore and left-side (e.g. 40°) at a magnitude that is roughly half the maximum inclination detectable by inclinometer 33.

Controller 312 uses this inclination information to control windrow door/chute angles. In the scenario shown in FIG. 5, the combine is leaning forward (i.e. the combine is on a decline). Due to this position, gravity has a greater effect on preventing the residue from exiting the back of the combine. This could cause thin windrows and a build-up of reside in the residue system that could cause a blockage (e.g. the windrow door could be blocked). To combat this issue, controller 312 may increase the angle (e.g. increase the opening) of the windrow door and/or decrease the angle (e.g. increase the decline) of the windrow chute to allow the residue to more easily exit the combine, effectively thickening the windrow to an acceptable level.

In another scenario (not shown), the combine may be leaning backward towards the Aft direction (i.e. the combine is on an incline). Due to this position, gravity has a greater effect on allowing the residue to easily exit the back of the combine. This could cause thick windrows that may be difficult to collect. To combat this issue, controller 312 may decrease the angle (e.g. decrease the opening) of the windrow door and/or increase the angle (e.g. decrease the incline) of the windrow chute to make it more difficult for the residue to exit the combine, effectively thinning out the windrow to an acceptable level.

Although not shown in FIG. 1B, windrow chute 108 may be maneuverable in a side-to-side (e.g. left to right) direction. In this configuration, windrow chute actuator 122 (or an additional actuator not shown) may position the windrow chute at an angle favoring either the left side or right side of the combine. This additional functionality may be beneficial in obtaining a desired shape of the windrow. For example, if the combine is tilted to the left (e.g. harvesting on the side of a hill) as shown in FIG. 5B, the windrow chute can be angled slightly towards the right of the combine to ensure that the windrow is formed directly behind the combine.

Figure 6:
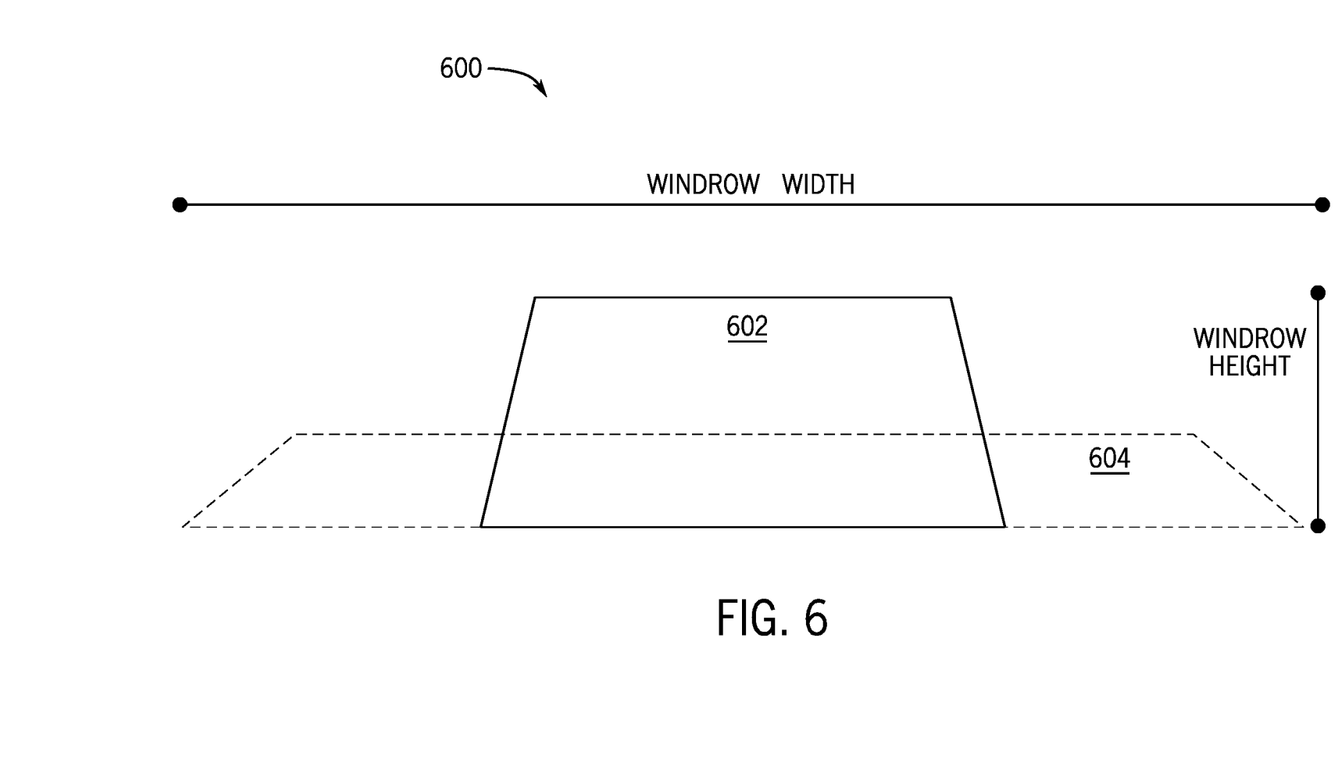
FIG. 6 shows a cross-sectional view of an acceptable windrow versus an unacceptable windrow, according to an embodiment of the disclosure.

As described above, a windrow can have various shapes, some of which are desirable, and others that are not. FIG. 6 shows a cross-sectional view 600 that compares the physical characteristics (e.g. height and width) of a desirable windrow 602 with the physical characteristics (e.g. height and width) of an undesirable windrow 604. In this example, windrow 602 has a desirable shape that makes it resistant to unwanted spreading from wind, and makes it easy to collect, whereas windrow 604 has an undesirable shape that makes it susceptible to unwanted spreading from wind, and makes it more difficult to collect.

During operation, controller 312 monitors the physical characteristics (e.g. height, width, shape, etc.) of the windrows in FIG. 6. For example, controller 312 can instruct camera 120 to capture continuous or periodic images of the windrow as it forms behind the combine. Controller 312 may then perform image processing (e.g. edge detection) to extract the physical characteristics (e.g. shape) of the windrow. Controller 312 can then adjust the angles of the windrow door and/or windrow chute until a desirable shape (e.g. shape 602) is achieved. For example, if controller 312 detects that the windrow has an undesirable shape 604, it may increase the angle of the windrow chute (e.g. make it more flat) to make it more difficult for the residue to exit the combine such that the residue builds up on the chute prior to falling to the ground. This action effectively thickens the windrow in an attempt to achieve a more desirable shape similar to windrow 602.

FIGS. 7A, 7B, 7C and 7D show flowcharts for controlling combine 10 during windrowing. As described below, a desirable windrow shape can be achieved by controlling the operational states of the windrow door and windrow chute based on physical properties of the windrow and/or operational parameters of the combine.

Figure 7A:
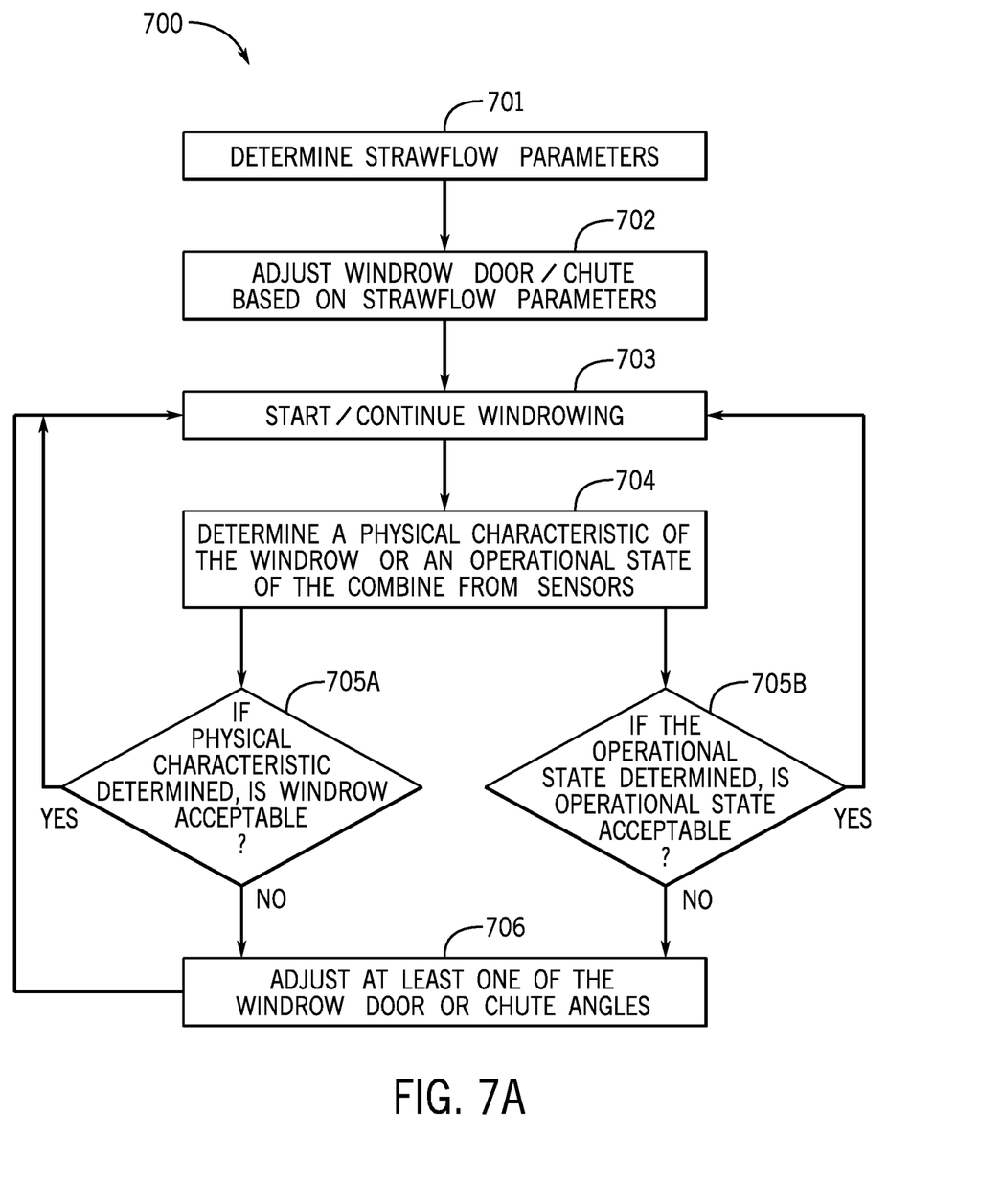
FIG. 7A shows a flowchart describing the operation of the combine, according to an embodiment of the disclosure.

Flowchart 700 in FIG. 7A shows the overall process for controlling the combine during windrowing. In step 701, controller 312 determines residue flow parameters. These residue flow parameters may include the type of crop, initial inclination of the combine, residue chopper speed, etc. In step 702, controller 312 adjusts the operational positions (e.g. angles) of windrow door 104 and windrow chute 108. Once the initial positions of windrow door 104 and windrow chute 108 are set, the combine starts windrowing in step 703. During windrowing, controller 312 determines a physical characteristic (e.g. height, width, shape, etc.) of the windrow and/or an operational state (e.g. inclination) of the combine.

In an example where the physical characteristic of the windrow is observed, controller 312 determines in step 705A if the physical characteristic is acceptable (e.g. if the shape is acceptable). If the physical characteristic is acceptable, then windrowing is continued. If the physical characteristic is unacceptable, then controller 312, in step 706, adjusts at least one of the angles for windrow door 104 and windrow chute 108, and repeatedly performs steps 704 and 705A during the windrowing mode to ensure that that the physical characteristic is acceptable.

For example, the controller may increase the windrow door angle or decrease the windrow chute angle when the physical characteristic indicates that a height of the windrow is greater than an upper threshold, and decrease the windrow door angle or increase the windrow chute angle when the physical characteristic indicates that the height of the windrow is less than a lower threshold.

In another example where the operational state of the combine is determined, controller 312 determines in step 705B if the operational state of the combine is acceptable (e.g. if the windrow door/chute are angled properly to account for the combine inclination). If the operational state of the combine is acceptable, then windrowing is continued. If the operational state of the combine is unacceptable, then controller 312, in step 706, adjusts at least one of the angles for windrow door 104 and windrow chute 108, and repeatedly performs steps 704 and 705B during the windrowing mode to ensure that that the operational state of the combine is acceptable.

Figure 7B:
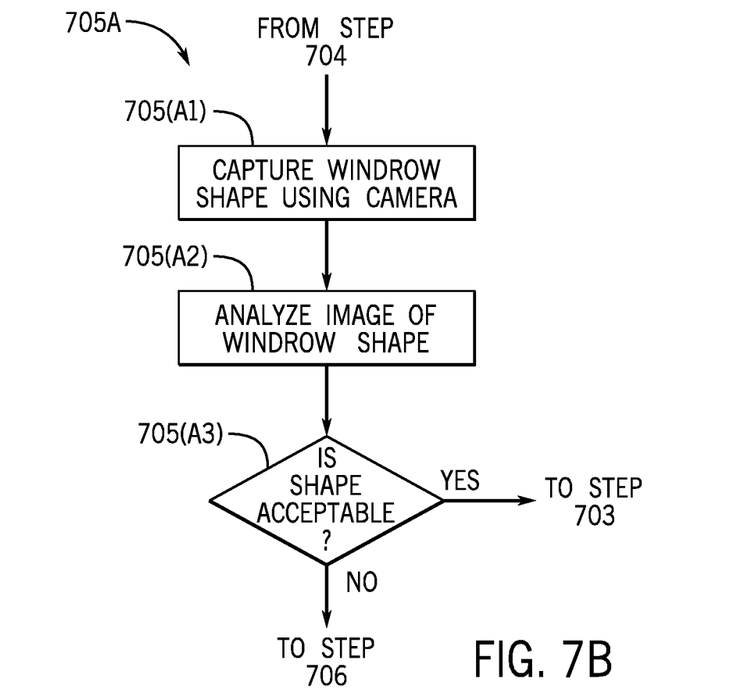
FIG. 7B shows a flowchart describing the use of a camera to control the operation of the combine, according to an embodiment of the disclosure.
Figure 7C:
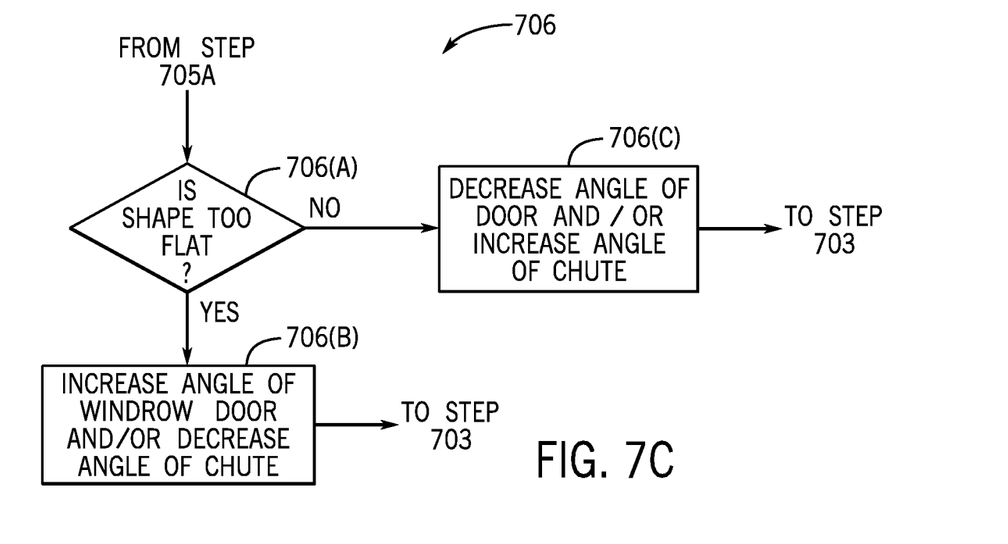
FIG. 7C shows a flowchart describing further details of the use of a camera to control the operation of the combine, according to an embodiment of the disclosure.

Further details of steps 705A and 706 are shown in FIGS. 7B and 7C for controlling the combine based on a physical characteristic of the windrow. For example, as shown in step 705(A1) of FIG. 7B, controller 312 controls camera 120 to capture images of the windrow. In step 705(A2), controller 312 analyzes the image to determine a physical characteristic (e.g. shape) of the windrow. In step 705(A3), controller 312 then makes a determination if the shape is acceptable or not. If the shape is acceptable, windrowing is continued in step 703. If, however, the shape is unacceptable, controller 312 adjusts the windrow door and windrow chute angles in step 706.

For example, if the shape is unacceptable, the process continues to step 706(A) of FIG. 7C, where controller 312 determines if the shape is too flat. If the shape is not too flat (e.g. the height is large enough), controller may decrease the angle of the windrow door (e.g. make the opening smaller)

and/or increase the angle of the windrow chute (e.g. make it more flat) in step 706(C) and then continue windrowing. If, however, the shape is too flat, controller may increase the angle of the windrow door and/or decrease the angle of the windrow chute in step 706(B) and then continue windrowing.

Figure 7D:
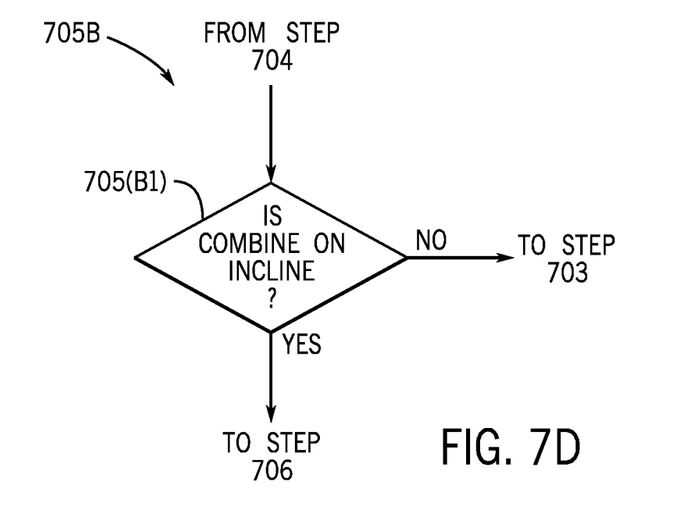
FIG. 7D shows a flowchart describing the use of an inclinometer to control the operation of the combine, according to an embodiment of the disclosure.
Figure 7E:
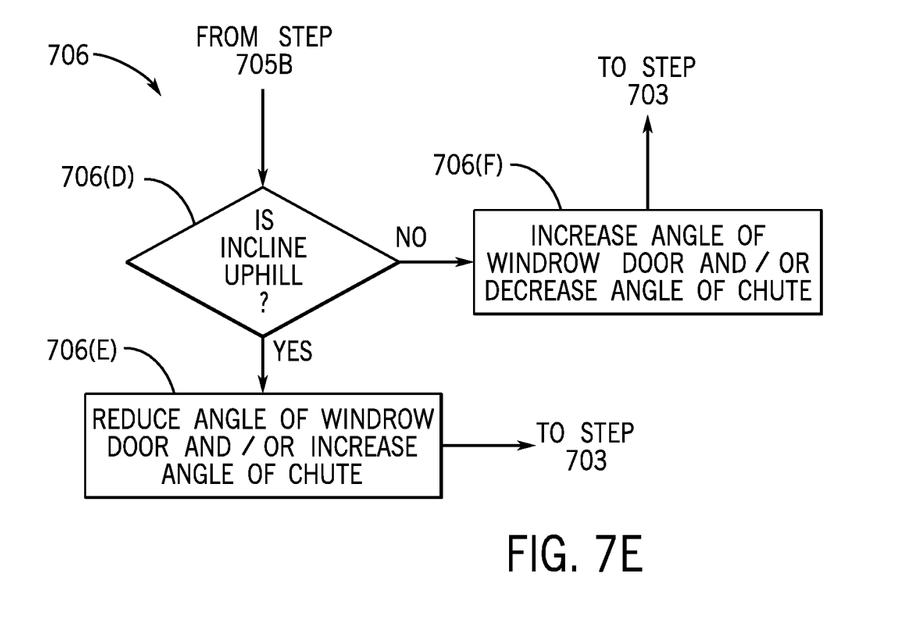
FIG. 7E shows a flowchart describing further details of the use of an inclinometer to control the operation of the combine, according to an embodiment of the disclosure.

Further details of steps 705(B) and 706 are shown in FIGS. 7D and 7E for controlling the combine based on an operational parameter of the combine. For example, as shown in step 705(B1) of FIG. 7D, controller 312 determines if the combine is on an incline. If the combine is not on an incline, windrowing is continued in step 703. If, however, the combine is on an incline, controller 312 proceeds to step 706.

As shown in step 706(D) of FIG. 7E, controller 312 determines if the combine is inclined uphill. If the combine is inclined uphill, controller may decrease the angle of the windrow door (e.g. make the opening smaller) and/or increase the angle of the windrow chute (e.g. make it more flat) in step 706(E) and then continue windrowing. If, however, the combine is inclined downhill, controller may increase the angle of the windrow door (e.g. make the opening larger) and/or decrease the angle of the windrow chute (e.g. make it more steep) in step 706(F) and then continue windrowing.

In either embodiment (e.g. controlling the combine based on physical characteristics of the windrow, operational parameters of the combine, or a combination of both), the result is that the windrow is formed in an acceptable manner. This makes it easier for the windrow to be collected at a later time.

Steps shown in FIGS. 7A-7D respectively are performed by controller 312 upon loading and executing software code or instructions which are tangibly stored on a tangible computer readable medium 315, such as on a magnetic medium, e.g., a computer hard drive, an optical medium, e.g., an optical disc, solid-state memory, e.g., flash memory, or other storage media known in the art. Thus, any of the functionality performed by the controller 312 described herein, such as the steps shown in FIGS. 7A-7D, are implemented in software code or instructions which are tangibly stored on a tangible computer readable medium. Upon loading and executing such software code or instructions by the controller 312, the controller 312 may perform any of the functionality of the controller 312 described herein, including the steps shown in FIGS. 7A-7D described herein.

The term "software code" or "code" used herein refers to any instructions or set of instructions that influence the operation of a computer or controller 312. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Although the disclosure is illustrated and described herein with reference to specific embodiments, the disclosure is not intended to be limited to the details shown. Rather various modifications may be made in the details within the scope and range of equivalence of the claims and without departing from the disclosure.

The invention claimed is:

1. A combine comprising:
   a feeder housing for receiving harvested crop;
   a separating system for threshing the harvested crop to produce grain and residue;
   a windrow door for expelling the residue from the combine;
   a windrow door actuator coupled to the windrow door to position the windrow door at a windrow door angle;
   a windrow chute for receiving the expelled residue from the windrow door and guiding the residue into a windrow;
   a windrow chute actuator coupled to the windrow chute to position the windrow chute at a windrow chute angle;
   an inclinometer that senses an inclination of the combine and provides the inclination in an output;
   a controller coupled to the inclinometer, the windrow door actuator, and the windrow chute actuator, the controller configured to:
   increase the windrow door angle or decrease the windrow chute angle when the inclination indicates that the combine is leaning towards a front of the combine, and
   decrease the windrow door angle or increase the windrow chute angle when the inclination indicates that the combine is leaning towards a rear of the combine.

2. The combine of claim 1,
   wherein the windrow door actuator is configured to adjust the windrow door to multiple predetermined windrow door angles,
   wherein the windrow chute actuator is configured to adjust the windrow chute to multiple predetermined windrow chute angles.

3. The combine of claim 1,
   wherein the controller is further configured to adjust at least one of the windrow door angle or the windrow chute angle based on at least one of a type of the crop being harvested, moisture of the crop being harvested or a speed of a rotor expelling the residue through the windrow door.

4. The combine of claim 1,
   wherein the controller is further configured to determine the windrow door angle and the windrow chute angle based on outputs of respective multi-positional encoders on the windrow door actuator and the windrow chute actuator.

5. A method for controlling a combine including a feeder housing for receiving harvested crop, a separating system for threshing the harvested crop to produce grain and residue, a windrow door for expelling the residue from the combine, a windrow door actuator coupled to the windrow door to position the windrow door at a windrow door angle, a windrow chute for receiving the expelled residue from the windrow door and guiding the residue into a windrow, a windrow chute actuator coupled to the windrow chute to position the windrow chute at a windrow chute angle, an inclinometer that senses an inclination of the combine and provides the inclination in an output, and a controller coupled to the inclinometer, the windrow door actuator, and the windrow chute actuator, the method comprising:

determining, by the controller, an inclination of the combine based on the output of the inclinometer;
adjusting, by the controller, at least one of the windrow door angle or the windrow chute angle based on the determined an inclination of the combine;
increasing, by the controller, the windrow door angle or decreasing the windrow chute angle when the inclination indicates that the combine is leaning towards a front of the combine; and
decreasing, by the controller, the windrow door angle or increasing the windrow chute angle when the inclination indicates that the combine is leaning towards a rear of the combine.

6. The method of claim 5, further comprising:
adjusting, by the windrow door actuator, the windrow door to multiple predetermined windrow door angles,
adjusting, by the windrow chute actuator, the windrow chute to multiple predetermined windrow chute angles.

7. The method of claim 5, further comprising:
adjusting, by the controller, at least one of the windrow door angle or the windrow chute angle based on at least one of a type of the crop being harvested, moisture of the crop being harvested, or a speed of a rotor expelling the residue through the windrow door.

8. The method of claim 5, further comprising:
determining, by the controller, the windrow door angle and the windrow chute angle based on outputs of respective multi-positional encoders on the windrow door actuator and the windrow chute actuator.

9. The combine of claim 1, wherein the controller is configured to set an initial position of the windrow door angle or the windrow chute angle based on the inclination.

10. The method of claim 5, further comprising:
setting, by the controller, an initial position of the windrow door angle or the windrow chute angle based on the inclination.

* * * * *